(12) United States Patent
Young et al.

(10) Patent No.: US 9,098,304 B2
(45) Date of Patent: Aug. 4, 2015

(54) DEVICE ENUMERATION SUPPORT METHOD FOR COMPUTING DEVICES THAT DOES NOT NATIVELY SUPPORT DEVICE ENUMERATION

(71) Applicant: Microsoft Corporation, Redmond, WA (US)

(72) Inventors: Robert D. Young, Kirkland, WA (US); Sharon Drasnin, Seattle, WA (US); Scott A. Fudally, Duvall, WA (US); Tejas Jitendra Mistry, Sammamish, WA (US); Vassili I. Nikolaev, Redmond, WA (US); Murali Rangayya Ravirala, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/645,405

(22) Filed: Oct. 4, 2012

(65) Prior Publication Data

US 2013/0304944 A1 Nov. 14, 2013

Related U.S. Application Data

(60) Provisional application No. 61/646,799, filed on May 14, 2012.

(51) Int. Cl.
*G06F 3/00* (2006.01)
*G06F 9/44* (2006.01)
(Continued)

(52) U.S. Cl.
CPC ............ *G06F 9/4415* (2013.01); *G06F 1/1669* (2013.01); *G06F 3/0202* (2013.01); *G06F 3/04886* (2013.01); *G06F 3/167* (2013.01); *G06F 2203/04809* (2013.01)

(58) Field of Classification Search
USPC ..................... 710/62, 72–74, 14–19
See application file for complete search history.

(56) References Cited

U.S. PATENT DOCUMENTS

| 4,046,975 A | 9/1977 | Seeger, Jr. |
| 4,065,649 A | 12/1977 | Carter et al. |

(Continued)

FOREIGN PATENT DOCUMENTS

| EP | 1223722 | 7/2002 |
| EP | 1591891 | 11/2005 |

(Continued)

OTHER PUBLICATIONS

"Corrected Notice of Allowance", U.S. Appl. No. 13/470,633, (Apr. 9, 2013), 2 pages.

(Continued)

*Primary Examiner* — Tammara Peyton
(74) *Attorney, Agent, or Firm* — Steve Wight; Judy Yee; Micky Minhas

(57) ABSTRACT

Device enumeration support techniques are described for busses that do not natively support enumeration. In one or more embodiments, an intermediate controller of a computing device is configured to interconnect and manage various hardware devices associated with the computing device. The intermediate controller may detect connection and disconnection of hardware devices in association with one or more communication busses employed by the computing device. In response to such detection, the intermediate controller may send appropriate notifications to an operating system to alert the operating system when hardware devices come and go. This enables the operating system to enumerate and denumerate hardware devices within a device configuration and power management system implemented by the operating system that facilitates interaction with the hardware devices through corresponding representations.

20 Claims, 6 Drawing Sheets

(51) Int. Cl.
  *G06F 3/16*    (2006.01)
  *G06F 1/16*    (2006.01)
  *G06F 3/02*    (2006.01)
  *G06F 3/0488*  (2013.01)

(56) References Cited

U.S. PATENT DOCUMENTS

| | | | |
|---|---|---|---|
| 4,243,861 A | 1/1981 | Strandwitz | |
| 4,279,021 A | 7/1981 | See et al. | |
| 4,302,648 A | 11/1981 | Sado et al. | |
| 4,317,013 A | 2/1982 | Larson | |
| 4,326,193 A | 4/1982 | Markley et al. | |
| 4,365,130 A | 12/1982 | Christensen | |
| 4,492,829 A | 1/1985 | Rodrique | |
| 4,527,021 A | 7/1985 | Morikawa et al. | |
| 4,559,426 A | 12/1985 | Van Zeeland et al. | |
| 4,588,187 A | 5/1986 | Dell | |
| 4,607,147 A | 8/1986 | Ono et al. | |
| 4,651,133 A | 3/1987 | Ganesan et al. | |
| 5,220,521 A | 6/1993 | Kikinis | |
| 5,283,559 A | 2/1994 | Kalenda et al. | |
| 5,331,443 A | 7/1994 | Stanisci | |
| 5,510,783 A | 4/1996 | Findlater et al. | |
| 5,548,477 A | 8/1996 | Kumar et al. | |
| 5,558,577 A | 9/1996 | Kato | |
| 5,576,981 A | 11/1996 | Parker et al. | |
| 5,681,220 A | 10/1997 | Bertram et al. | |
| 5,745,376 A | 4/1998 | Barker et al. | |
| 5,748,114 A | 5/1998 | Koehn | |
| 5,781,406 A | 7/1998 | Hunte | |
| 5,807,175 A | 9/1998 | Davis et al. | |
| 5,818,361 A | 10/1998 | Acevedo | |
| 5,828,770 A | 10/1998 | Leis et al. | |
| 5,874,697 A | 2/1999 | Selker et al. | |
| 5,926,170 A | 7/1999 | Oba | |
| 5,971,635 A | 10/1999 | Wise | |
| 6,002,389 A | 12/1999 | Kasser | |
| 6,005,209 A | 12/1999 | Burleson et al. | |
| 6,012,714 A | 1/2000 | Worley et al. | |
| 6,040,823 A | 3/2000 | Seffernick et al. | |
| 6,044,717 A | 4/2000 | Biegelsen et al. | |
| 6,061,644 A | 5/2000 | Leis | |
| 6,178,443 B1 | 1/2001 | Lin | |
| 6,254,105 B1 | 7/2001 | Rinde et al. | |
| 6,279,060 B1 | 8/2001 | Luke et al. | |
| 6,329,617 B1 | 12/2001 | Burgess | |
| 6,344,791 B1 | 2/2002 | Armstrong | |
| 6,380,497 B1 | 4/2002 | Hashimoto et al. | |
| 6,437,682 B1 | 8/2002 | Vance | |
| 6,511,378 B1 | 1/2003 | Bhatt et al. | |
| 6,532,147 B1 | 3/2003 | Christ, Jr. | |
| 6,543,949 B1 | 4/2003 | Ritchey et al. | |
| 6,565,439 B2 | 5/2003 | Shinohara et al. | |
| 6,600,121 B1 | 7/2003 | Olodort et al. | |
| 6,603,408 B1 | 8/2003 | Gaba | |
| 6,617,536 B2 | 9/2003 | Kawaguchi | |
| 6,685,369 B2 | 2/2004 | Lien | |
| 6,704,864 B1 | 3/2004 | Philyaw | |
| 6,721,019 B2 | 4/2004 | Kono et al. | |
| 6,725,318 B1 | 4/2004 | Sherman et al. | |
| 6,738,049 B2 | 5/2004 | Kiser et al. | |
| 6,774,888 B1 | 8/2004 | Genduso | |
| 6,776,546 B2 | 8/2004 | Kraus et al. | |
| 6,780,019 B1 | 8/2004 | Ghosh et al. | |
| 6,784,869 B1 | 8/2004 | Clark et al. | |
| 6,813,143 B2 | 11/2004 | Makela | |
| 6,819,316 B2 | 11/2004 | Schulz et al. | |
| 6,856,506 B2 | 2/2005 | Doherty et al. | |
| 6,861,961 B2 | 3/2005 | Sandbach et al. | |
| 6,914,197 B2 | 7/2005 | Doherty et al. | |
| 6,950,950 B2 | 9/2005 | Sawyers et al. | |
| 6,970,957 B1 | 11/2005 | Oshins et al. | |
| 6,976,799 B2 | 12/2005 | Kim et al. | |
| 7,051,149 B2 | 5/2006 | Wang et al. | |
| 7,091,436 B2 | 8/2006 | Serban | |
| 7,091,955 B2 | 8/2006 | Kramer | |
| 7,106,222 B2 | 9/2006 | Ward et al. | |
| 7,123,292 B1 | 10/2006 | Seeger et al. | |
| 7,194,662 B2 | 3/2007 | Do et al. | |
| 7,202,837 B2 | 4/2007 | Ihara | |
| 7,213,991 B2 | 5/2007 | Chapman et al. | |
| 7,277,087 B2 | 10/2007 | Hill et al. | |
| 7,423,557 B2 | 9/2008 | Kang | |
| 7,447,934 B2 | 11/2008 | Dasari et al. | |
| 7,469,386 B2 | 12/2008 | Bear et al. | |
| 7,499,037 B2 | 3/2009 | Lube | |
| 7,502,803 B2 | 3/2009 | Culter et al. | |
| 7,542,052 B2 | 6/2009 | Solomon et al. | |
| 7,558,594 B2 | 7/2009 | Wilson | |
| 7,559,834 B1 | 7/2009 | York | |
| 7,622,907 B2 | 11/2009 | Vranish | |
| 7,636,921 B2 | 12/2009 | Louie | |
| 7,639,876 B2 | 12/2009 | Clary et al. | |
| 7,656,392 B2 | 2/2010 | Bolender | |
| 7,686,694 B2 | 3/2010 | Cole | |
| 7,733,326 B1 | 6/2010 | Adiseshan | |
| 7,777,972 B1 | 8/2010 | Chen et al. | |
| 7,782,342 B2 | 8/2010 | Koh | |
| 7,813,715 B2 | 10/2010 | McKillop et al. | |
| 7,865,639 B2 | 1/2011 | McCoy et al. | |
| 7,884,807 B2 | 2/2011 | Hovden et al. | |
| D636,397 S | 4/2011 | Green | |
| 7,928,964 B2 | 4/2011 | Kolmykov-Zotov et al. | |
| 7,945,717 B2 | 5/2011 | Rivalsi | |
| 7,973,771 B2 | 7/2011 | Geaghan | |
| 7,976,393 B2 | 7/2011 | Haga et al. | |
| 7,978,281 B2 | 7/2011 | Vergith et al. | |
| 8,053,688 B2 | 11/2011 | Conzola et al. | |
| 8,065,624 B2 | 11/2011 | Morin et al. | |
| 8,069,356 B2 | 11/2011 | Rathi et al. | |
| 8,090,885 B2 | 1/2012 | Callaghan et al. | |
| 8,117,362 B2 | 2/2012 | Rodriguez et al. | |
| 8,118,681 B2 | 2/2012 | Mattice et al. | |
| 8,130,203 B2 | 3/2012 | Westerman | |
| 8,154,524 B2 | 4/2012 | Wilson et al. | |
| D659,139 S | 5/2012 | Gengler | |
| 8,169,421 B2 | 5/2012 | Wright et al. | |
| 8,216,074 B2 | 7/2012 | Sakuma | |
| 8,229,509 B2 | 7/2012 | Paek et al. | |
| 8,229,522 B2 | 7/2012 | Kim et al. | |
| 8,255,708 B1 | 8/2012 | Zhang | |
| 8,269,093 B2 | 9/2012 | Naik et al. | |
| 8,387,078 B2 | 2/2013 | Memmott | |
| 8,498,100 B1 | 7/2013 | Whitt, III et al. | |
| 8,570,725 B2 | 10/2013 | Whitt, III et al. | |
| 8,757,374 B1 | 6/2014 | Kaiser | |
| 8,780,541 B2 | 7/2014 | Whitt et al. | |
| 8,830,668 B2 | 9/2014 | Whitt, III et al. | |
| 8,896,993 B2 | 11/2014 | Belesiu et al. | |
| 8,947,864 B2 | 2/2015 | Whitt, III et al. | |
| 8,949,477 B2 | 2/2015 | Drasnin | |
| 2001/0035859 A1 | 11/2001 | Kiser | |
| 2002/0000977 A1 | 1/2002 | Vranish | |
| 2002/0070883 A1 | 6/2002 | Dosch | |
| 2002/0126445 A1 | 9/2002 | Minaguchi et al. | |
| 2002/0134828 A1 | 9/2002 | Sandbach et al. | |
| 2002/0154099 A1 | 10/2002 | Oh | |
| 2002/0188721 A1 | 12/2002 | Lemel et al. | |
| 2003/0044215 A1 | 3/2003 | Monney et al. | |
| 2003/0132916 A1 | 7/2003 | Kramer | |
| 2003/0163611 A1 | 8/2003 | Nagao | |
| 2003/0197687 A1 | 10/2003 | Shetter | |
| 2004/0005184 A1 | 1/2004 | Kim et al. | |
| 2004/0160734 A1 | 8/2004 | Yim | |
| 2004/0174670 A1 | 9/2004 | Huang et al. | |
| 2004/0190239 A1 | 9/2004 | Weng et al. | |
| 2004/0212598 A1 | 10/2004 | Kraus et al. | |
| 2004/0258924 A1 | 12/2004 | Berger et al. | |
| 2004/0268000 A1 | 12/2004 | Barker et al. | |
| 2005/0057515 A1 | 3/2005 | Bathiche | |
| 2005/0057521 A1 | 3/2005 | Aull et al. | |
| 2005/0059489 A1 | 3/2005 | Kim | |
| 2005/0146512 A1 | 7/2005 | Hill et al. | |
| 2005/0190159 A1 | 9/2005 | Skarine | |

(56) References Cited

U.S. PATENT DOCUMENTS

| | | |
|---|---|---|
| 2005/0240949 A1 | 10/2005 | Liu et al. |
| 2005/0264653 A1 | 12/2005 | Starkweather et al. |
| 2005/0264988 A1 | 12/2005 | Nicolosi |
| 2006/0085658 A1 | 4/2006 | Allen et al. |
| 2006/0096392 A1 | 5/2006 | Inkster et al. |
| 2006/0103633 A1 | 5/2006 | Gioeli |
| 2006/0125799 A1 | 6/2006 | Hillis et al. |
| 2006/0154725 A1 | 7/2006 | Glaser et al. |
| 2006/0156415 A1 | 7/2006 | Rubinstein et al. |
| 2006/0181514 A1 | 8/2006 | Newman |
| 2006/0181521 A1 | 8/2006 | Perreault et al. |
| 2006/0195522 A1 | 8/2006 | Miyazaki |
| 2006/0238510 A1 | 10/2006 | Panotopoulos et al. |
| 2006/0248597 A1 | 11/2006 | Keneman |
| 2007/0051792 A1 | 3/2007 | Wheeler et al. |
| 2007/0062089 A1 | 3/2007 | Homer et al. |
| 2007/0072474 A1 | 3/2007 | Beasley et al. |
| 2007/0117600 A1 | 5/2007 | Robertson et al. |
| 2007/0176902 A1 | 8/2007 | Newman et al. |
| 2007/0182663 A1 | 8/2007 | Biech |
| 2007/0185590 A1 | 8/2007 | Reindel et al. |
| 2007/0234420 A1 | 10/2007 | Novotney et al. |
| 2007/0236408 A1 | 10/2007 | Yamaguchi et al. |
| 2007/0247338 A1 | 10/2007 | Marchetto |
| 2007/0247432 A1 | 10/2007 | Oakley |
| 2007/0257821 A1 | 11/2007 | Son et al. |
| 2007/0260892 A1 | 11/2007 | Paul et al. |
| 2007/0283179 A1 | 12/2007 | Burnett et al. |
| 2008/0005423 A1 | 1/2008 | Jacobs et al. |
| 2008/0018611 A1 | 1/2008 | Serban et al. |
| 2008/0053222 A1 | 3/2008 | Ehrensvard et al. |
| 2008/0104437 A1 | 5/2008 | Lee |
| 2008/0151478 A1 | 6/2008 | Chern |
| 2008/0158185 A1 | 7/2008 | Westerman |
| 2008/0228969 A1 | 9/2008 | Cheah et al. |
| 2008/0238884 A1 | 10/2008 | Harish |
| 2008/0253822 A1 | 10/2008 | Matias |
| 2008/0309636 A1 | 12/2008 | Feng et al. |
| 2008/0316002 A1 | 12/2008 | Brunet et al. |
| 2008/0320190 A1 | 12/2008 | Lydon et al. |
| 2009/0002218 A1 | 1/2009 | Rigazio et al. |
| 2009/0007001 A1 | 1/2009 | Morin et al. |
| 2009/0009476 A1 | 1/2009 | Daley, III |
| 2009/0046416 A1 | 2/2009 | Daley, III |
| 2009/0049979 A1 | 2/2009 | Naik et al. |
| 2009/0065267 A1 | 3/2009 | Sato |
| 2009/0073957 A1 | 3/2009 | Newland et al. |
| 2009/0117955 A1 | 5/2009 | Lo |
| 2009/0135142 A1 | 5/2009 | Fu et al. |
| 2009/0140985 A1 | 6/2009 | Liu |
| 2009/0182901 A1 | 7/2009 | Callaghan et al. |
| 2009/0219250 A1 | 9/2009 | Ure |
| 2009/0251008 A1 | 10/2009 | Sugaya |
| 2009/0262492 A1 | 10/2009 | Whitchurch et al. |
| 2009/0303204 A1 | 12/2009 | Nasiri et al. |
| 2009/0320244 A1 | 12/2009 | Lin |
| 2009/0321490 A1 | 12/2009 | Groene et al. |
| 2010/0001963 A1 | 1/2010 | Doray et al. |
| 2010/0026656 A1 | 2/2010 | Hotelling et al. |
| 2010/0038821 A1 | 2/2010 | Jenkins et al. |
| 2010/0045633 A1 | 2/2010 | Gettemy et al. |
| 2010/0051432 A1 | 3/2010 | Lin et al. |
| 2010/0053534 A1 | 3/2010 | Hsieh et al. |
| 2010/0077237 A1 | 3/2010 | Sawyers |
| 2010/0085321 A1 | 4/2010 | Pundsack |
| 2010/0103112 A1 | 4/2010 | Yoo et al. |
| 2010/0103131 A1 | 4/2010 | Segal et al. |
| 2010/0141588 A1 | 6/2010 | Kimura et al. |
| 2010/0149104 A1 | 6/2010 | Sim et al. |
| 2010/0149111 A1 | 6/2010 | Olien |
| 2010/0161522 A1 | 6/2010 | Tirpak et al. |
| 2010/0162109 A1 | 6/2010 | Chatterjee et al. |
| 2010/0164857 A1 | 7/2010 | Liu et al. |
| 2010/0171891 A1 | 7/2010 | Kaji et al. |
| 2010/0174421 A1 | 7/2010 | Tsai et al. |
| 2010/0180063 A1 | 7/2010 | Ananny et al. |
| 2010/0188299 A1 | 7/2010 | Rinehart et al. |
| 2010/0188338 A1 | 7/2010 | Longe |
| 2010/0206614 A1 | 8/2010 | Park et al. |
| 2010/0222110 A1 | 9/2010 | Kim et al. |
| 2010/0231556 A1 | 9/2010 | Mines et al. |
| 2010/0238119 A1 | 9/2010 | Dubrovsky et al. |
| 2010/0250988 A1 | 9/2010 | Okuda et al. |
| 2010/0274932 A1 | 10/2010 | Kose |
| 2010/0279768 A1 | 11/2010 | Huang et al. |
| 2010/0289457 A1 | 11/2010 | Onnerud et al. |
| 2010/0295812 A1 | 11/2010 | Burns et al. |
| 2010/0302378 A1 | 12/2010 | Marks et al. |
| 2010/0306538 A1 | 12/2010 | Thomas et al. |
| 2010/0308778 A1 | 12/2010 | Yamazaki et al. |
| 2010/0308844 A1 | 12/2010 | Day et al. |
| 2010/0313680 A1 | 12/2010 | Joung et al. |
| 2010/0315348 A1 | 12/2010 | Jellicoe et al. |
| 2010/0321301 A1 | 12/2010 | Casparian et al. |
| 2010/0324457 A1 | 12/2010 | Bean et al. |
| 2010/0325155 A1 | 12/2010 | Skinner et al. |
| 2011/0007008 A1 | 1/2011 | Algreatly |
| 2011/0012873 A1 | 1/2011 | Prest et al. |
| 2011/0019123 A1 | 1/2011 | Prest et al. |
| 2011/0031287 A1 | 2/2011 | Le Gette et al. |
| 2011/0037721 A1 | 2/2011 | Cranfill et al. |
| 2011/0043990 A1 | 2/2011 | Mickey et al. |
| 2011/0050587 A1 | 3/2011 | Natanzon et al. |
| 2011/0057899 A1 | 3/2011 | Sleeman et al. |
| 2011/0060926 A1 | 3/2011 | Brooks et al. |
| 2011/0069148 A1 | 3/2011 | Jones et al. |
| 2011/0074688 A1 | 3/2011 | Hull et al. |
| 2011/0095994 A1 | 4/2011 | Birnbaum |
| 2011/0096513 A1 | 4/2011 | Kim |
| 2011/0102326 A1 | 5/2011 | Casparian et al. |
| 2011/0118025 A1 | 5/2011 | Lukas et al. |
| 2011/0134032 A1 | 6/2011 | Chiu et al. |
| 2011/0147398 A1 | 6/2011 | Ahee et al. |
| 2011/0163955 A1 | 7/2011 | Nasiri et al. |
| 2011/0164370 A1 | 7/2011 | McClure et al. |
| 2011/0167181 A1 | 7/2011 | Minoo et al. |
| 2011/0167287 A1 | 7/2011 | Walsh et al. |
| 2011/0167391 A1 | 7/2011 | Momeyer et al. |
| 2011/0179864 A1 | 7/2011 | Raasch et al. |
| 2011/0184646 A1 | 7/2011 | Wong et al. |
| 2011/0193787 A1 | 8/2011 | Morishige et al. |
| 2011/0205372 A1 | 8/2011 | Miramontes |
| 2011/0227913 A1 | 9/2011 | Hyndman |
| 2011/0231682 A1 | 9/2011 | Kakish et al. |
| 2011/0234502 A1 | 9/2011 | Yun et al. |
| 2011/0248920 A1 | 10/2011 | Larsen |
| 2011/0267300 A1 | 11/2011 | Serban et al. |
| 2011/0267757 A1 | 11/2011 | Probst |
| 2011/0290686 A1 | 12/2011 | Huang |
| 2011/0297566 A1 | 12/2011 | Gallagher et al. |
| 2011/0304577 A1 | 12/2011 | Brown |
| 2011/0304962 A1 | 12/2011 | Su |
| 2011/0306424 A1 | 12/2011 | Kazama et al. |
| 2011/0316807 A1 | 12/2011 | Corrion |
| 2012/0007821 A1 | 1/2012 | Zaliva |
| 2012/0023459 A1 | 1/2012 | Westerman |
| 2012/0024682 A1 | 2/2012 | Huang et al. |
| 2012/0044179 A1 | 2/2012 | Hudson |
| 2012/0047368 A1 | 2/2012 | Chinn et al. |
| 2012/0050975 A1 | 3/2012 | Garelli et al. |
| 2012/0068933 A1 | 3/2012 | Larsen |
| 2012/0072167 A1 | 3/2012 | Cretella, Jr. et al. |
| 2012/0075249 A1 | 3/2012 | Hoch |
| 2012/0092279 A1 | 4/2012 | Martin |
| 2012/0094257 A1 | 4/2012 | Pillischer et al. |
| 2012/0099263 A1 | 4/2012 | Lin |
| 2012/0099749 A1 | 4/2012 | Rubin et al. |
| 2012/0106082 A1 | 5/2012 | Wu et al. |
| 2012/0117409 A1 | 5/2012 | Lee et al. |
| 2012/0127118 A1 | 5/2012 | Nolting et al. |
| 2012/0140396 A1 | 6/2012 | Zeliff et al. |
| 2012/0145525 A1 | 6/2012 | Ishikawa |
| 2012/0162693 A1 | 6/2012 | Ito |
| 2012/0182242 A1 | 7/2012 | Lindahl et al. |

(56) References Cited

U.S. PATENT DOCUMENTS

| | | | |
|---|---|---|---|
| 2012/0194448 A1 | 8/2012 | Rothkopf |
| 2012/0224073 A1 | 9/2012 | Miyahara |
| 2012/0235921 A1 | 9/2012 | Laubach |
| 2012/0246377 A1 | 9/2012 | Bhesania |
| 2012/0256959 A1 | 10/2012 | Ye et al. |
| 2012/0268911 A1 | 10/2012 | Lin |
| 2012/0274811 A1 | 11/2012 | Bakin |
| 2012/0287562 A1 | 11/2012 | Wu et al. |
| 2012/0300275 A1 | 11/2012 | Vilardell et al. |
| 2012/0328349 A1 | 12/2012 | Isaac et al. |
| 2013/0044074 A1 | 2/2013 | Park et al. |
| 2013/0063873 A1 | 3/2013 | Wodrich et al. |
| 2013/0067126 A1 | 3/2013 | Casparian et al. |
| 2013/0094131 A1 | 4/2013 | O'Donnell et al. |
| 2013/0217451 A1 | 8/2013 | Komiyama et al. |
| 2013/0229758 A1 | 9/2013 | Belesiu |
| 2013/0229760 A1 | 9/2013 | Whitt, III |
| 2013/0278552 A1 | 10/2013 | Kamin-Lyndgaard |
| 2013/0300647 A1 | 11/2013 | Drasnin |
| 2013/0301206 A1 | 11/2013 | Whitt |
| 2013/0304941 A1 | 11/2013 | Drasnin |
| 2013/0322000 A1 | 12/2013 | Whitt |
| 2013/0322001 A1 | 12/2013 | Whitt |
| 2013/0335330 A1 | 12/2013 | Lane |
| 2013/0342464 A1 | 12/2013 | Bathiche et al. |
| 2013/0342465 A1 | 12/2013 | Bathiche |
| 2013/0346636 A1 | 12/2013 | Bathiche |
| 2014/0204514 A1 | 7/2014 | Whitt |
| 2014/0204515 A1 | 7/2014 | Whitt |
| 2014/0221098 A1 | 8/2014 | Boulanger |
| 2014/0247546 A1 | 9/2014 | Whitt |
| 2015/0036274 A1 | 2/2015 | Belesiu et al. |

FOREIGN PATENT DOCUMENTS

| | | |
|---|---|---|
| EP | 2353978 | 8/2011 |
| GB | 2178570 | 2/1987 |
| JP | 10326124 | 12/1998 |
| JP | 11345041 | 12/1999 |
| JP | 2000010654 | 1/2000 |
| WO | WO-2012036717 | 3/2012 |

OTHER PUBLICATIONS

"Corrected Notice of Allowance", U.S. Appl. No. 13/470,633, (Jul. 2, 2013), 2 pages.
"Non-Final Office Action", U.S. Appl. No. 13/653,682, (Jun. 3, 2013), 14 pages.
"Notice of Allowance", U.S. Appl. No. 13/651,327, (Jun. 11, 2013), 7 pages.
"ACPI Docking for Windows Operating Systems", Retrieved at <<http://www.scritube.com/limba/engleza/software/ACPI-Docking-for-Windows-Opera331824193.php>>, Retrieved Date Junly 6, 2012, pp. 10.
"Corrected Notice of Allowance", U.S. Appl. No. 13/651,327, (Sep. 12, 2013), 2 pages.
"Corrected Notice of Allowance", U.S. Appl. No. 13/651,327, (Sep. 23, 2013), 2 pages.
"Non-Final Office Action", U.S. Appl. No. 13/527,263, (Jul. 19, 2013), 5 pages.
"Non-Final Office Action", U.S. Appl. No. 13/938,930, (Aug. 29, 2013), 9 pages.
"Non-Final Office Action", U.S. Appl. No. 13/939,002, (Aug. 28, 2013), 6 pages.
"Non-Final Office Action", U.S. Appl. No. 13/939,032, (Aug. 29, 2013), 7 pages.
"Write & Learn Spellboard Advanced", Available at <http://somemanuals.com/VTECH,WRITE%2526LEARN--SPELLBOARD--ADV--71000,JIDFHE.PDF>, (2006), 22 pages.
Bathiche, Steven N., et al., "Input Device with Interchangeable Surface", U.S. Appl. No. 13/974,749, (Aug. 23, 2013), 51 pages.
Lance, David M., et al., "Media Processing Input Device", U.S. Appl. No. 13/655,065, (Oct. 18, 2012), 43 pages.
"Advanced Configuration and Power Management Specification", *Intel Corporation, Microsoft Corporation, Toshiba Corp. Revision 1*, (Dec. 22, 1996), 364 pages.
"Final Office Action", U.S. Appl. No. 13/653,682, (Oct. 18, 2013), 16 pages.
"Final Office Action", U.S. Appl. No. 13/938,930, (Nov. 8, 2013), 10 pages.
"Final Office Action", U.S. Appl. No. 13/939,002, (Nov. 8, 2013), 7 pages.
"International Search Report and Written Opinion", Application No. PCT/US2013/040968, (Sep. 5, 2013), 12 pages.
"Notice to Grant", CN Application No. 201320097124.7, (Oct. 8, 2013), 2 pages.
"Accessing Device Sensors", retrieved from <https://developer.palm.com/content/api/dev-guide/pdk/accessing-device-sensors.html> on May 25, 2012, 4 pages.
"First One Handed Fabric Keyboard with Bluetooth Wireless Technology", Retrieved from: <http://press.xtvworld.com/article3817.html> on May 8, 2012,(Jan. 6, 2005),2 pages.
"Force and Position Sensing Resistors: An Emerging Technology", *Interlink Electronics*, Available at <http://staff.science.uva.nl/~vlaander/docu/FSR/An_Exploring_Technology.pdf>,(Feb. 1990), pp. 1-6.
"Frogpad Introduces Weareable Fabric Keyboard with Bluetooth Technology", Retrieved from: <http://www.geekzone.co.nz/content.asp?contentid=3898> on May 7, 2012,(Jan. 7, 2005), 3 pages.
"Incipio LG G-Slate Premium Kickstand Case—Black Nylon", Retrieved from: <http://www.amazon.com/Incipio-G-Slate-Premium-Kickstand-Case/dp/B004ZKP916> on May 8, 2012, 4 pages.
"Membrane Keyboards & Membrane Keypads", Retrieved from: <http://www.pannam.com/> on May 9, 2012,(Mar. 4, 2009), 2 pages.
"Motion Sensors", *Android Developers*, retrieved from <http://developer.android.com/guide/topics/sensors/sensors_motion.html> on May 25, 2012, 7 pages.
"Position Sensors", *Android Developers*, retrieved from <http://developer.android.com/guide/topics/sensors/sensors_position.html> on May 25, 2012, 5 pages.
"SolRxTM E-Series Multidirectional Phototherapy Expandable TM 2-Bulb Full Body Panel System", Retrieved from: < http://www.solarcsystems.com/us_multidirectional_uv_light_therapy_1_intro.html > on Jul. 25, 2012(2011), 4 pages.
"Virtualization Getting Started Guide", *Red Hat Enterprise Linux 6, Edition 0.2*, retrieved from <http://docs.redhat.com/docs/en-US/Red_Hat_Enterprise_Linux/6/html-single/Virtualization_Getting_Started_Guide/index.html> on Jun. 13, 2012,24 pages.
Block, Steve et al., "Device Orientation Event Specification", *W3C, Editor's Draft*, retrieved form <https://developer.palm.com/content/api/dev-guide/pdk/accessing-device-sensors.html> on May 25, 2012,(Jul. 12, 2011), 14 pages.
Brown, Rich "Microsoft Shows Off Pressure-Sensitive Keyboard", retrieved from <http://news.cnet.com/8301-17938_105-10304792-1.html> on May 7, 2012, (Aug. 6, 2009), 2 pages.
Butler, Alex et al., "SideSight: Multi-"touch" Interaction around Small Devices", *In the proceedings of the 21st annual ACM symposium on User interface software and technology.*, retrieved from <http://research.microsoft.com/pubs/132534/sidesight_crv3.pdf> on May 29, 2012,(Oct. 19, 2008), 4 pages.
Crider, Michael "Sony Slate Concept Tablet "Grows" a Kickstand", Retrieved from: <http://androidcommunity.com/sony-slate-concept-tablet-grows-a-kickstand-20120116/> on May 4, 2012,(Jan. 16, 2012), 9 pages.
Dietz, Paul H., et al., "A Practical Pressure Sensitive Computer Keyboard", In Proceedings of UIST 2009,(Oct. 2009), 4 pages.
Glatt, Jeff "Channel and Key Pressure (Aftertouch).", Retrieved from: <http://home.roadrunner.com/~jgglatt/tutr/touch.html> on Jun. 11, 2012, 2 pages.
Hanlon, Mike "ElekTex Smart Fabric Keyboard Goes Wireless", Retrieved from <http://www.gizmag.com/go/5048/ > on May 7, 2012,(Jan. 15, 2006), 5 pages.
Kaur, Sukhmani "Vincent Liew's redesigned laptop satisfies ergonomic needs", Retrieved from <http://www.designbuzz.com/entry/

(56) References Cited

OTHER PUBLICATIONS vincent-liew-s-redesigned-laptop-satisfies-ergonomic-needs/> on Jul. 27, 2012,(Jun. 21, 2010), 4 pages.

Khuntontong, Puttachat et al., "Fabrication of Molded Interconnection Devices by Ultrasonic Hot Embossing on Thin Polymer Films", IEEE Transactions on Electronics Packaging Manufacturing, vol. 32, No. 3,(Jul. 2009), pp. 152-156.

Linderholm, Owen "Logitech Shows Cloth Keyboard for PDAs", Retrieved from: <http://www.pcworld.com/article/89084/logitech_shows_cloth_keyboard_for_pdas.html> on May 7, 2012,(Mar. 15, 2002), 5 pages.

McLellan, Charles "Eleksen Wireless Fabric Keyboard: a first look", Retrieved from: <http://www.zdnetasia.com/eleksen-wireless-fabric-keyboard-a-first-look-40278954.htm> on May 7, 2012,(Jul. 17, 2006), 9 pages.

Post, E.R. et al., "E-Broidery: Design and Fabrication of Textile-Based Computing", IBM Systems Journal, vol. 39, Issue 3 & 4,(Jul. 2000), pp. 840-860.

Purcher, Jack "Apple is Paving the Way for a New 3D GUI for IOS Devices", Retrieved from: <http://www.patentlyapple.com/patently-apple/2012/01/apple-is-paving-the-way-for-a-new-3d-gui-for-ios-devices.html> on Jun. 4, 2012,(Jan. 12, 2012),15 pages.

Takamatsu, Seiichi et al., "Flexible Fabric Keyboard with Conductive Polymer-Coated Fibers", In Proceedings of Sensors 2011,(Oct. 28, 2011), 4 pages.

Zhang, et al., "Model-Based Development of Dynamically Adaptive Software", *In Proceedings of ICSE 2006*, Available at <http://www.irisa.fr/lande/lande/icse-proceedings/icse/p371.pdf>,(May 20, 2006), pp. 371-380.

"Cholesteric Liquid Crystal", Retrieved from: <http://en.wikipedia.org/wiki/Cholesteric_liquid_crystal> on Aug. 6, 2012,(Jun. 10, 2012), 2 pages.

"Cirago Slim Case®—Protective case with built-in kickstand for your iPhone 5®", Retrieved from <http://cirago.com/wordpress/wp-content/uploads/2012/10/ipc1500brochure1.pdf> on Jan. 29, 2013, (Jan. 2013),1 page.

"iControlPad 2—The open source controller", Retrieved from <http://www.kickstarter.com/projects/1703567677/icontrolpad-2-the-open-source-controller> on Nov. 20, 2012, (2012), 15 pages.

"i-Interactor electronic pen", Retrieved from: <http://www.alibaba.com/product-gs/331004878/i_Interactor_electronic_pen.html> on Jun. 19, 2012,5 pages.

"MPC Fly Music Production Controller", *AKAI Professional*, Retrieved from: <http://www.akaiprompc.com/mpc-fly> on Jul. 9, 2012, 4 pages.

"Non-Final Office Action", U.S. Appl. No. 13/471,001, (Feb. 19, 2013), 15 pages.

"Non-Final Office Action", U.S. Appl. No. 13/471,139, (Mar. 21, 2013), 12 pages.

"Non-Final Office Action", U.S. Appl. No. 13/471,202, (Feb. 11, 2013), 10 pages.

"Non-Final Office Action", U.S. Appl. No. 13/471,336, (Jan. 18, 2013), 14 pages.

"Non-Final Office Action", U.S. Appl. No. 13/651,195, (Jan. 2, 2013), 14 pages.

"Non-Final Office Action", U.S. Appl. No. 13/651,232, (Jan. 17, 2013), 15 pages.

"Non-Final Office Action", U.S. Appl. No. 13/651,272, (Feb. 12, 2013), 10 pages.

"Non-Final Office Action", U.S. Appl. No. 13/651,287, (Jan. 29, 2013), 13 pages.

"Non-Final Office Action", U.S. Appl. No. 13/651,304, (Mar. 22, 2013), 9 pages.

"Non-Final Office Action", U.S. Appl. No. 13/651,327, (Mar. 22, 2013), 6 pages.

"Non-Final Office Action", U.S. Appl. No. 13/651,871, (Mar. 18, 2013), 14 pages.

"Non-Final Office Action", U.S. Appl. No. 13/651,976, (Feb. 22, 2013), 16 pages.

"Non-Final Office Action", U.S. Appl. No. 13/653,321, (Feb. 1, 2013), 13 pages.

"Non-Final Office Action", U.S. Appl. No. 13/653,682, (Feb. 7, 2013), 11 pages.

"Notice of Allowance", U.S. Appl. No. 13/470,633, (Mar. 22, 2013), 7 pages.

"Reflex LCD Writing Tablets", retrieved from <http://www.kentdisplays.com/products/lcdwritingtablets.html> retrieved from on Jun. 27, 2012, 3 pages.

"Restriction Requirement", U.S. Appl. No. 13/471,139, (Jan. 17, 2013), 7 pages.

"Restriction Requirement", U.S. Appl. No. 13/651,304, (Jan. 18, 2013), 7 pages.

"Restriction Requirement", U.S. Appl. No. 13/651,726, (Feb. 22, 2013), 6 pages.

"Restriction Requirement", U.S. Appl. No. 13/651,871, (Feb. 7, 2013), 6 pages.

"SMART Board™ Interactive Display Frame Pencil Pack", Available at <http://downloads01.smarttech.com/media/sitecore/en/support/product/sbfpd/400series(interactivedisplayframes)/guides/smartboardinteractivedisplayframepencilpackv12mar09.pdf>,(2009), 2 pages.

"The Microsoft Surface Tablets Comes With Impressive Design and Specs", Retrieved from <http://microsofttabletreview.com/the-microsoft-surface-tablets-comes-with-design-and-specs> on Jan. 30, 2013, (Jun. 2012), 2 pages.

"Tilt Shift Lenses: Perspective Control", retrieved from http://www.cambridgeincolour.com/tutorials/tilt-shift-lenses1.htm, (Mar. 28, 2008), 11 Pages.

"What is Active Alignment?", http://www.kasalis.com/active_alignment.html, retrieved on Nov. 22, 2012, 2 Pages.

Miller, Matthew "MOGA gaming controller enhances the Android gaming experience", Retrieved from <http://www.zdnet.com/moga-gaming-controller-enhances-the-android-gaming-experience-7000007550/> on Nov. 22, 2012, (Nov. 18, 2012), 9 pages.

Qin, Yongqiang et al., "pPen: Enabling AuthenticatedPen and Touch Interaction on Tabletop Surfaces", *In Proceedings of ITS 2010*, Available at <http://www.dfki.de/its2010/papers/pdf/po172.pdf>,(Nov. 2010), pp. 283-284.

Staff, "Gametel Android controller turns tablets, phones into portable gaming devices", Retrieved from <http://www.mobiletor.com/2011/11/18/gametel-android-controller-turns-tablets-phones-into-portable-gaming-devices/#> on Nov. 20, 2012, (Nov. 18, 2011), 5 pages.

Sumimoto, Mark "Touch & Write: Surface Computing With Touch and Pen Input", Retrieved from: <http://www.gottabemobile.com/2009/08/07/touch-write-surface-computing-with-touch-and-pen-input/> on Jun. 19, 2012,(Aug. 7, 2009), 4 pages.

"Corrected Notice of Allowance", U.S. Appl. No. 13/938,930, May 6, 2014, 2 pages.

"Corrected Notice of Allowance", U.S. Appl. No. 13/938,930, Jun. 6, 2014, 2 pages.

"Corrected Notice of Allowance", U.S. Appl. No. 13/939,002, May 22, 2014, 2 pages.

"Corrected Notice of Allowance", U.S. Appl. No. 13/939,002, Jun. 19, 2014, 2 pages.

"Corrected Notice of Allowance", U.S. Appl. No. 13/939,002, May 5, 2014, 2 pages.

"Corrected Notice of Allowance", U.S. Appl. No. 13/939,032, Jun. 26, 2014, 2 pages.

"Corrected Notice of Allowance", U.S. Appl. No. 13/939,032, Jul. 15, 2014, 2 pages.

"Final Office Action", U.S. Appl. No. 13/653,682, Jun. 11, 2014, 11 pages.

"International Search Report and Written Opinion", Application No. PCT/US2013/028766, Jun. 26, 2014, 11 pages.

"International Search Report and Written Opinion", Application No. PCT/US2013/028772, Jun. 30, 2014, 11 pages.

"International Search Report and Written Opinion", Application No. PCT/US2014/014522, Jun. 6, 2014, 13 pages.

"Microsoft Tablet PC", Retrieved from <http://web.archive.org/web/20120622064335/https://en.wikipedia.org/wiki/Microsoft_Tablet_PC> on Jun. 4, 2014, Jun. 21, 2012, 9 pages.

(56) References Cited

OTHER PUBLICATIONS

"Non-Final Office Action", U.S. Appl. No. 13/974,994, Jun. 4, 2014, 24 pages.
"Non-Final Office Action", U.S. Appl. No. 13/975,087, May 8, 2014, 18 pages.
"Non-Final Office Action", U.S. Appl. No. 14/225,250, Jun. 17, 2014, 5 pages.
"Non-Final Office Action", U.S. Appl. No. 14/225,276, Jun. 13, 2014, 6 pages.
"Non-Final Office Action", U.S. Appl. No. 14/277,240, Jun. 13, 2014, 6 pages.
"Notice of Allowance", U.S. Appl. No. 13/471,186, Jul. 3, 2014, 7 pages.
"Advisory Action", U.S. Appl. No. 13/939,032, Feb. 24, 2014, 2 pages.
"Final Office Action", U.S. Appl. No. 13/939,032, Dec. 20, 2013, 5 pages.
"International Search Report and Written Opinion", Application No. PCT/US2013/045283, Mar. 12, 2014, 19 pages.
"International Search Report and Written Opinion", Application No. PCT/US2013/044873, Nov. 22, 2013, 9 pages.
"Non-Final Office Action", U.S. Appl. No. 13/471,186, Feb. 27, 2014, 8 pages.
"Non-Final Office Action", U.S. Appl. No. 13/527,263, Apr. 3, 2014, 6 pages.
"Non-Final Office Action", U.S. Appl. No. 13/653,682, Feb. 26, 2014, 10 pages.
"Non-Final Office Action", U.S. Appl. No. 13/655,065, Apr. 24, 2014, 16 pages.
"Non-Final Office Action", U.S. Appl. No. 13/939,002, Dec. 20, 2013, 5 pages.
"Notice of Allowance", U.S. Appl. No. 13/938,930, Feb. 20, 2014, 4 pages.
"Notice of Allowance", U.S. Appl. No. 13/939,002, Mar. 3, 2014, 4 pages.
"Notice of Allowance", U.S. Appl. No. 13/939,032, Apr. 3, 2014, 4 pages.
"Final Office Action", U.S. Appl. No. 13/655,065, Aug. 8, 2014, 20 pages.
"Final Office Action", U.S. Appl. No. 13/974,994, Oct. 6, 2014, 26 pages.
"Final Office Action", U.S. Appl. No. 13/975,087, Sep. 10, 2014, 19 pages.
"Non-Final Office Action", U.S. Appl. No. 13/759,875, Aug. 1, 2014, 16 pages.
"Notice of Allowance", U.S. Appl. No. 13/653,682, Sep. 24, 2014, 4 pages.
"Notice of Allowance", U.S. Appl. No. 14/277,240, Sep. 16, 2014, 4 pages.
"Corrected Notice of Allowance", U.S. Appl. No. 14/277,240, Jan. 8, 2015, 2 pages.
"Final Office Action", U.S. Appl. No. 13/527,263, Jan. 27, 2015, 7 pages.
"Final Office Action", U.S. Appl. No. 14/225,276, Dec. 17, 2014, 6 pages.
"Non-Final Office Action", U.S. Appl. No. 13/655,065, Dec. 19, 2014, 24 pages.
"Non-Final Office Action", U.S. Appl. No. 13/974,994, Jan. 23, 2015, 26 pages.
"Non-Final Office Action", U.S. Appl. No. 13/975,087, Feb. 27, 2015, 20 pages.
"Snugg iPad 3 Keyboard Case—Cover Ultra Slim Bluetooth Keyboard Case for the iPad 3 & iPad 2", Retrieved from <https://web.archive.org/web/20120810202056/http://www.amazon.com/Snugg-iPad-Keyboard-Case-Bluetooth/dp/B008CCHXJE> on Jan. 23, 2015, Aug. 10, 2012, 4 pages.
"Writer 1 for iPad 1 keyboard + Case (Aluminum Bluetooth Keyboard, Quick Eject and Easy Angle Function!)", Retrieved from <https://web.archive.org/web/20120817053825/http://www.amazon.com/keyboard-Aluminum-Bluetooth-Keyboard-Function/dp/B004OQLSLG> on Jan. 23, 2015, Aug. 17, 2012, 5 pages.
"Final Office Action", U.S. Appl. No. 13/655,065, Apr. 2, 2015, 23 pages.
"Final Office Action", U.S. Appl. No. 13/759,875, Mar. 27, 2015, 18 pages.
"Final Office Action", U.S. Appl. No. 13/974,994, Jun. 10, 2015, 28 pages.
"Final Office Action", U.S. Appl. No. 14/225,250, Mar. 13, 2015, 7 pages.
"Non-Final Office Action", U.S. Appl. No. 14/225,276, Apr. 23, 2015, 7 pages.
"Notice of Allowance", U.S. Appl. No. 14/225,276, Jun. 22, 2015, 4 pages.

DEVICE ENUMERATION SUPPORT METHOD FOR COMPUTING DEVICES THAT DOES NOT NATIVELY SUPPORT DEVICE ENUMERATION

RELATED APPLICATIONS

This application claims priority under 35 U.S.C. Section 119(e) to U.S. Provisional Patent Application No. 61/646,799, filed May 14, 2012, the disclosure of which is hereby incorporated by reference in its entirety, this application also incorporates the following applications by reference in their entirety: U.S. patent application Ser. No. 13/470,633, filed May 14, 2012, and titled "Flexible Hinge and Removable Attachment;" U.S. patent application Ser. No. 13/471,186, filed May 14, 2012, and titled "Input Device Layers and Nesting;" and U.S. patent application Ser. No. 13/527,263, filed Jun. 19, 2012, and titled "Accessory Device Architecture."

BACKGROUND

Mobile computing devices have been developed to increase the functionality that is made available to users in a mobile setting. For example, a user may interact with a mobile phone, tablet computer, or other mobile computing device to check email, surf the web, compose texts, interact with applications, and so on. Some traditional communication busses (e.g., universal serial bus (USB)) used to interconnect connect hardware devices associated with a computing device may consume significant amounts of power, which may hinder the mobility of the device. Accordingly, alternative busses may be selected by a hardware developer for device designs to improve power consumption characteristics of the computing device. However, at least some alternative busses may not natively support device enumeration (e.g., plug-and-play or hot swapping capabilities), which may complicate addition/removal of hardware and detract from a user's experience with the device.

SUMMARY

Device enumeration support techniques are described for busses that do not natively support enumeration. In one or more embodiments, an intermediate controller of a computing device is configured to interconnect and manage various hardware devices associated with the computing device. The intermediate controller may detect connection and disconnection of hardware devices in association with one or more communication busses employed by the computing device. In response to such detection, the intermediate controller may send appropriate notifications to an operating system to alert the operating system when hardware devices come and go. This enables the operating system to enumerate and/or denumerate hardware devices within a device configuration and power management system implemented by the operating system that facilitates interaction with the hardware devices through corresponding representations.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Some modern communication busses that are selected or developed as alternatives to traditional busses because of their power consumption characteristics may not natively support device enumeration (e.g., plug-and-play or hot swapping capabilities). Thus, addition and removal of hardware for computing devices that make use of such modern communication busses may be complicated.

Device enumeration support techniques are described for busses that do not natively support enumeration. In one or more embodiments, an intermediate controller of a computing device is configured to interconnect and manage various hardware devices associated with the computing device. The intermediate controller may detect connection and disconnection of hardware devices in association with one or more communication busses employed by the computing device. In response to such detection, the intermediate controller may send appropriate notifications to an operating system to alert the operating system when hardware devices come and go. This enables the operating system to enumerate and denumerate hardware devices within a device configuration and power management system implemented by the operating system that facilitates interaction with the hardware devices through corresponding representations.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
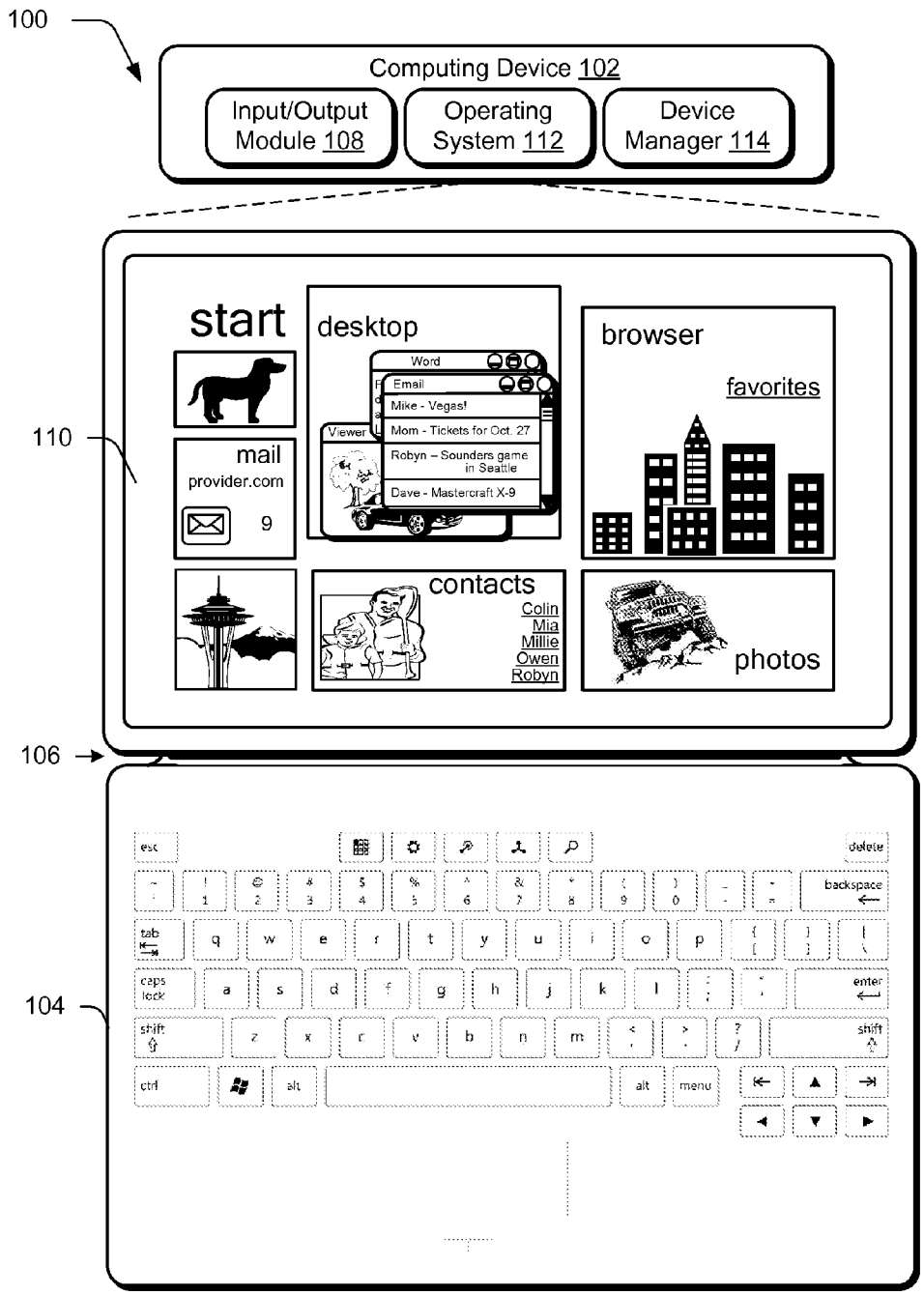
FIG. 1 is an illustration of an environment in an example implementation that is operable to employ the techniques described herein.

FIG. 1 is an illustration of an environment 100 in an example implementation that is operable to employ the techniques described herein. The illustrated environment 100 includes an example of a computing device 102 that is physically and communicatively coupled to an accessory device 104 via a flexible hinge 106. The computing device 102 may be configured in a variety of ways. For example, the computing device 102 may be configured for mobile use, such as a mobile phone, a tablet computer as illustrated, and so on. Thus, the computing device 102 may range from full resource devices with substantial memory and processor resources to a low-resource device with limited memory and/or processing resources. The computing device 102 may also relate to software that causes the computing device 102 to perform one or more operations.

The computing device 102, for instance, is illustrated as including an input/output module 108. The input/output module 108 is representative of functionality relating to processing of inputs and rendering outputs of the computing device 102. A variety of different inputs may be processed by the input/output module 108, such as inputs relating to functions that correspond to keys of the accessory device 104, keys of a virtual keyboard displayed by the display device 110 to identify gestures and cause operations to be performed that correspond to the gestures that may be recognized through the accessory device 104 and/or touchscreen functionality of the display device 110, and so forth. Other input devices are also contemplated, such as a mouse, track pad, camera to detect gestures, and so on. Thus, the input/output module 108 may support a variety of different input techniques by recognizing and leveraging a division between types of inputs including key presses, gestures, and so on.

In the illustrated example, the accessory device 104 is configured as a keyboard having a QWERTY arrangement of keys although other arrangements are also contemplated, such as storage devices, peripheral devices, output devices, and so on. Further, other non-conventional configurations are also contemplated, such as a game controller, configuration to mimic a musical instrument, and so forth. Thus, the accessory device 104 and keys incorporated by the accessory device 104 may assume a variety of different configurations to support a variety of different functionality.

As previously described, the accessory device 104 is physically and communicatively coupled to the computing device 102 in this example through use of a flexible hinge 106, although other examples are also contemplated such as a wireless connection. The flexible hinge 106 is flexible in that rotational movement supported by the hinge is achieved through flexing (e.g., bending) of the material forming the hinge as opposed to mechanical rotation as supported by a pin, although that embodiment is also contemplated. Further, this flexible rotation may be configured to support movement in one direction (e.g., vertically in the figure) yet restrict movement in other directions, such as lateral movement of the accessory device 104 in relation to the computing device 102. This may be used to support consistent alignment of the accessory device 104 in relation to the computing device 102, such as to align sensors used to change power states, application states, and so on.

The flexible hinge 106, for instance, may be formed using one or more layers of fabric and include conductors formed as flexible traces to communicatively couple the accessory device 104 to the computing device 102 and vice versa. This communication, for instance, may be used to communicate a result of a key press to the computing device 102, receive power from the computing device, perform authentication, provide supplemental power to the computing device 102, and so on.

As further illustrated in FIG. 1, the computing device 102 may include an operating system 112. Generally speaking, the operating system 112 is configured to abstract underlying functionality of the computing device 102 to applications that are executable on the computing device 102. For example, the operating system 112 may abstract processing, memory, network, and/or display functionality of the computing device 102 such that the applications may be written without knowing "how" this underlying functionality is implemented. The operating system 112 may provide various services, interfaces, and functionality that applications may invoke to take advantage of system features. A variety of applications to provide a wide range of functionality to the computing device 102 are contemplated including but not limited to a browser, an office productivity application, an email client, a multimedia management program, device management software, a software development environment, and networking applications, to name a few examples.

The operating system 108 may also represent a variety of other functionality, such as to manage a file system and a user interface that is navigable by a user of the computing device 102. An example of this is illustrated as the user interface configured as an application launcher or start screen (e.g., desktop) for the computing device 102 that is depicted in FIG. 1. The representations or tiles as shown in the illustrated example are selectable to launch a corresponding one of the applications for execution on the computing device 102. In this way, a user may readily navigate through a file structure and initiate execution of applications of interest.

The computing device 102 further includes a device manager 114 that represents functionality operable to enumerate, expose, manage, configure, and otherwise provide interactions with various hardware devices associated with a computing device 102. The device manager 114 provides an interface for configuration and power management of hardware devices by the operating system 112. The device manager therefore operates to enumerate hardware devices so that the devices are recognized by the operating system 112 to enable various tasks for management of the devices. The device manager 114 may be implemented as an integrated component of the operating system. Alternatively, the device manager 114 may be implemented as a standalone component that the operating system may invoke for device configuration and power management tasks as illustrated in FIG. 1. The device manager 114 may be representative of any suitable device and firmware management system(s) commonly implemented by a computing device 102, such as by way of example and not limitation Unified Extensible Firmware Interface (UEFI), Advanced Configuration and Power Interface (ACPI), Basic Input Output System (BIOS) interfaces, and/or proprietary device management systems, techniques, communication protocols, and communication busses.

The device manager 114 may also incorporate functionality operable to expose a user interface that lists available hardware devices and enables users and applications to interact with the available hardware devices. Such interaction may include but is not limited to viewing enumerated devices and properties, enabling and disabling devices, detecting and handling device errors, controlling drivers for the hardware devices, and so forth.

Figure 2:
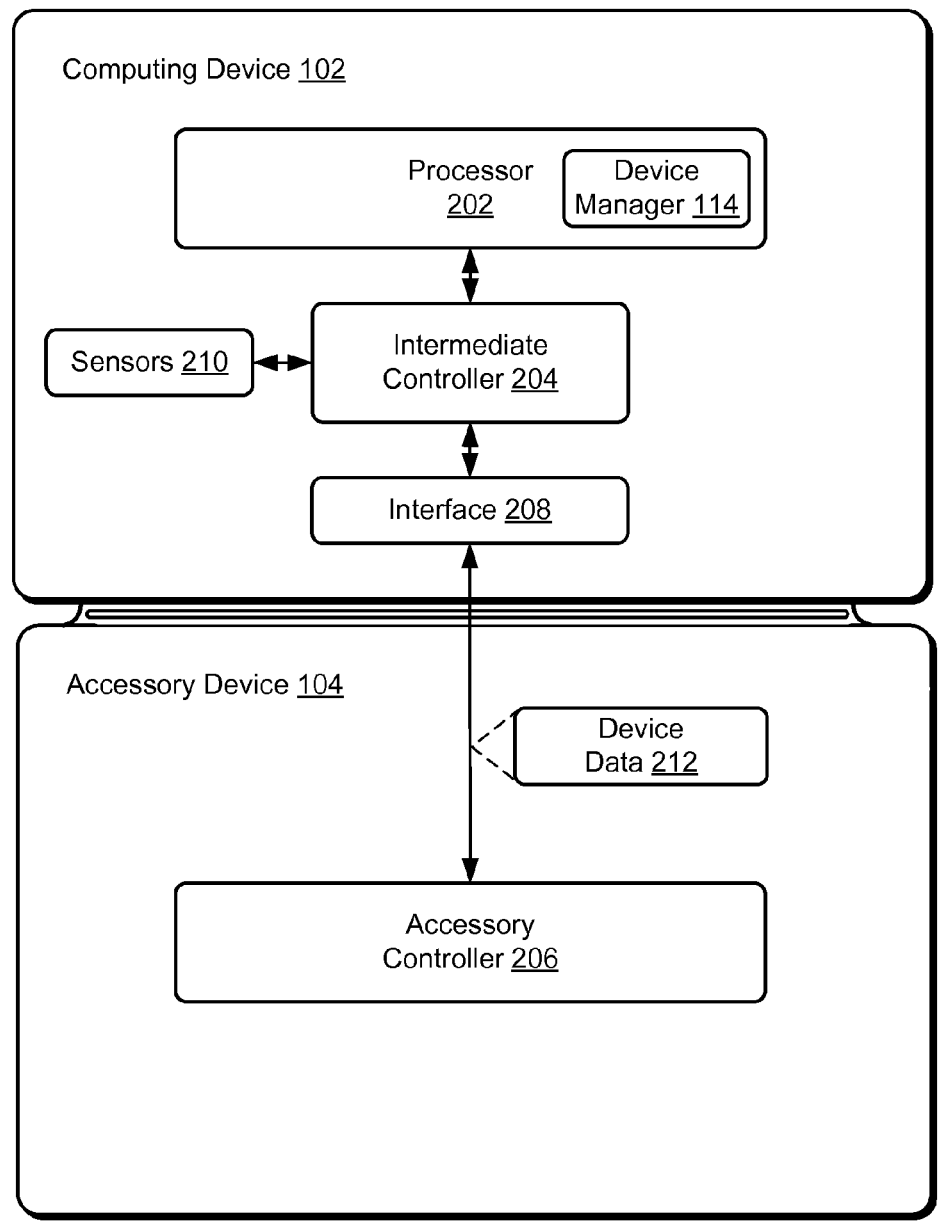
FIG. 2 is an illustration of an example implementation showing an architecture employable by a computing device and accessory device of FIG. 1.

FIG. 2 depicts an implementation showing an example architecture 200 employable by the computing device 102 and the accessory device 104 of FIG. 1. The illustrated architecture 200 includes a processor 202 and an intermediate controller 204 of a computing device 102 that is communicatively coupled to an accessory controller 206 of the accessory device via an interface 208. The processor 202 may be configured to provide primary processing resources of the computing device 102, such as to execute an operating system, applications, and other software of the computing device 102.

Consequently, the processor 202 may consume significant amounts of power, relatively, when in an active state as opposed to a sleep state.

In order to reduce power consumed by the processor 202, the architecture 200 may employ an intermediate controller 204. The intermediate controller 204 may be configured to provide a variety of different functionality, such as to provide functionality while the processor 202 is in a sleep state. This functionality, for instance, may include communication with one or more sensors 210 of the computing device 102 without communication through the processor 202. The intermediate controller 204 may leverage this communication to support waking of the accessory device 104, processor 202, and so on. Thus, these components and devices may remain in a sleep state until a determination is made by the intermediate controller 204 to "wake" these components and devices, thereby conserving power. A variety of other examples are also contemplated without departing from the spirit and scope thereof.

In operation, the intermediate controller 204 may also facilitate enumeration of hardware devices to a device manager 114, which in FIG. 2 is depicted as being executed via the processor 202. To do so, the intermediate controller 204 may be configured to communicate with hardware such as sensors 210 and various accessory devices 104 via respective interfaces. For example, the intermediate controller 204 is illustrated as being configured to communicate with an accessory controller 206 associated with the accessory device 104 of FIG. 2, through an interface 208. The accessory device 104, for instance, may be removably physically coupled to the interface 208 of the computing device 102, which may be used to support a communicative coupling such that device data 212 may be communicated between the computing device 102 and the accessory device 104.

Device data 212 that is exchanged may include at least a device identifier (device ID). The operating system and other device specific applications may then use the device identifier to identify a device and distinguish between devices. Additional device data 212 may also be communicated, such as status information, a device name or nickname, metadata, and/or other device parameters. Various device data 212 may be employed by the device manager 114 to create a node for a corresponding device to represent the device within the runtime environment of the operating system 112. The transport mechanism (e.g., the communicative coupling) and device data 212 communicated via this transport mechanism may take a variety of different configurations, an example of which is shown in relation to FIG. 3.

In accordance with techniques described herein, the interface 208 may represent various different kinds of communication busses used for the communications between hardware of the computing device. In general, the example architecture 200 may employ various different kinds of communication busses to interconnect hardware devices. Some communication busses used for such interconnections do not natively support device enumeration. In other words, this type of bus may not support plug and play like connection and automatic recognition of devices by the operating system 112 and/or device manager 114 to add/remove the devices. This type of bus may be selected over busses that do support natively support device enumeration (e.g., universal serial bus (USB)) due to cost, power, and/or, bandwidth considerations. Examples of such busses include but are not limited to serial peripheral interface (SPI), universal asynchronous receiver/transmitter (UART), Inter-Integrated Circuit (I2C), and other non-USB busses.

Various techniques described above and below enable plug and play like support to enumerate and denumerate devices for busses that do not natively support device enumeration. The techniques enable the example architecture 200 to support device enumeration generally for different devices without having to update system firmware or firmware of intermediate controller 204 to specifically recognize individual devices. Accordingly, future devices may be added "on-the fly." The described techniques may be implemented to provide plug and play like support in connection with various types of busses and transport mechanisms. Additional details regarding these and other aspects are discussed in relation to the following figures.

Figure 3:
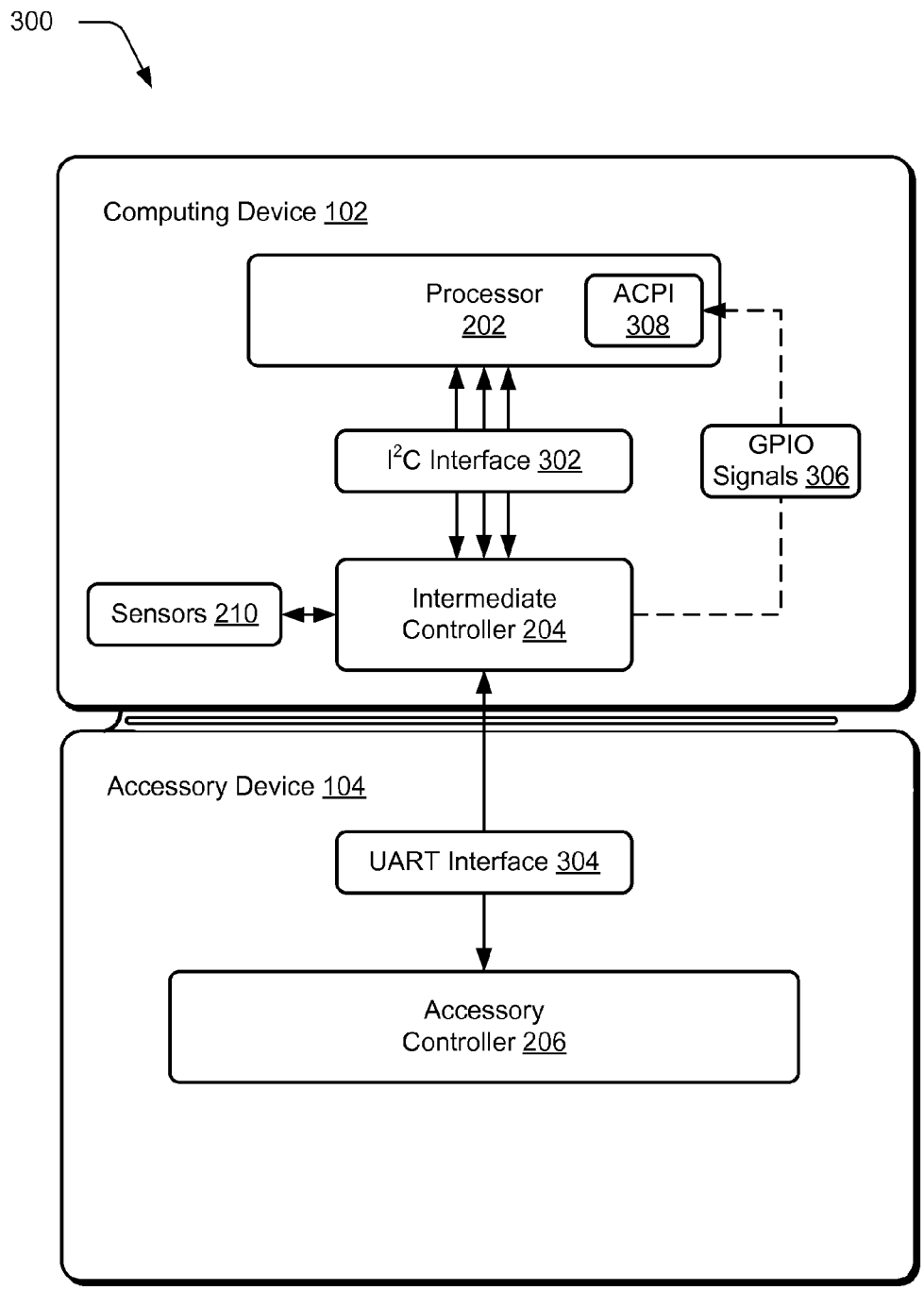
FIG. 3 is an example implementation of an architecture showing a transport mechanism to support a communicative coupling in greater detail.

FIG. 3 is an implementation of an architecture 300 showing an example transport mechanism to support a communicative coupling in greater detail. In the illustrated example, the architecture 300 employs a transport mechanism that is configured to consume less power than conventional transport mechanisms. An example of such a mechanism is an I$^2$C interface 302 (i.e., Inter-Integrated Circuit), which may be configured to consume less power than conventional transport mechanisms (e.g., USB). This I$^2$C interface 302 may also be configured to reduce power consumption through clocking, in which the mechanism is clocked when actively engaged in transport but is not otherwise as opposed to conventional techniques in which clocking is performed continuously. Other examples are also contemplated, such as to support I$^2$C clock stretching. In the illustrated example, the device data 212 configured to enumerate, denumerate, and otherwise permit communication between the accessory device 104 and the computing device 102 is communicated over I$^2$C interface 302, although other interfaces/busses are also contemplated.

In at least some embodiments, the I$^2$C interface 302 may be implemented using three wires or less, which include two data communication lines and a ground to support communication between the processor 202 and intermediate controller 204. This simplifies implementation of this transport mechanism as opposed to conventional transport mechanisms, thereby reducing manufacturing and assembly processes and reducing costs. Further, a single wire/control line disposed between the processor 202 and intermediate controller 204 may be employed to facilitate device enumeration techniques described herein. A UART interface 304 is shown as communicatively coupling the intermediate controller 204 to the accessory controller 206, although other connections are also contemplated. Generally, the UART interface 304 or other suitable interface enables the intermediate controller 204 to detect when the accessory device 104 is connected and disconnected. The intermediate controller 204 may then operate to notify the operating system 112 in a prescribed manner as different devices are connected and disconnected.

It should be noted that the intermediate controller 204 may be connected to the processor 202 and other hardware devices by the same type of bus (e.g., using one of I2C, UART, SPI, etc. for multiple interconnections to hardware devices) or using a combination of different communication busses (e.g., using I2C and UART as illustrated or another combination). The described techniques may enable device enumeration for any such busses and combinations of busses that do not natively support enumeration.

Notifications by the intermediate controller 204 for device enumeration may be configured in any suitable way to provide device enumeration support for busses. In the example of FIG. 3, the intermediate controller 204 is configured to use general purpose input/output (GPIO) signals 306 (e.g., interrupts) to alert the operating system 112 and/or a device manager 114 of the system when hardware comes and goes. In the depicted example, the device manager 114 is illustrated as an ACPI 308 executed on the processor 202 to implement device configuration and management functionality. The intermediate controller 204 may be configured to selectively drive a designated GPIO pin high/low to communicate device connections/disconnections to the ACPI 308 via one or more interfaces. The intermediate controller 204 may also handle notifications for other hardware devices, such as sensors 210, in a comparable manner.

In response to a notification from the intermediate controller 204, ACPI 308 (or another suitable device manager 114) may perform operations to configure and manage hardware devices for use with the operating system 112. This may include for example, determining device status, creating device nodes or entries to represent devices as they are added, loading appropriate device data 212, removing nodes for disconnected devices, enabling interaction with the devices through various lists, representations, and user interfaces, and so forth. Other transport mechanisms and bus combinations are also contemplated without departing from the spirit and scope thereof which may consume higher or lower amounts of power. Naturally, a variety of other implementations are also contemplated which may incorporate similar functionality, examples of which are discussed in relation to the following example procedures.

Having considered the foregoing example operating environment, devices, and device architecture, consider now some example procedures in accordance with one or more embodiments.

Example Procedures

The following discussion describes device enumeration support techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-3.

Figure 4:
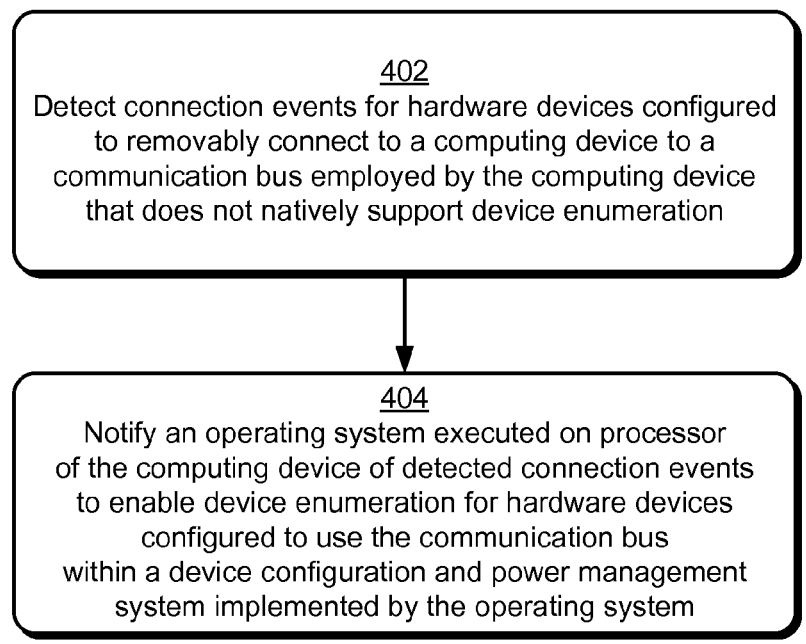
FIG. 4 is a flow diagram depicting a procedure in an example implementation in which notifications are provided to an operating system to support device enumeration for busses that do not natively support enumeration.

FIG. 4 depicts a procedure 400 in an example implementation in which an operating system is notified as devices are added and removed to enable device enumeration for busses that do not natively support enumeration. Connection events are detected for hardware devices configured to removably connect to a computing device via an interface corresponding to a communication bus employed by the computing device that does not natively support device enumeration (block 402). A variety of different kinds of busses that do not support enumeration are contemplated as previously described. The connection events that are detected may be triggered responsive to at least addition of hardware devices to the computing device and removal of hardware devices from the computing device. Hardware devices may include accessory devices 104 as well as other hardware that may be added and removed from computing devices.

In at least some embodiments, connection events may be detected by an intermediate controller 204 configured to handle such events. For example, the intermediate controller 204 may detect connection and removal of devices via corresponding interfaces 208. This may occur in any suitable way. For example, the intermediate controller 204 may communicate with an accessory controller 206 to ascertain when a corresponding accessory device 104 is connected or disconnected. In one approach, the intermediate controller 204 may periodically ping devices to determine which devices are connected. In addition or alternatively, the intermediate controller 204 may monitor interfaces 208 to recognize connections and disconnections of devices. Various other examples are also contemplated. In one or more embodiments, functionality represented by the intermediate controller 204 may be implemented in hardware as depicted in FIGS. 2 and 3, via one or more modules executed at least partially by a processor 202 or other logic devices, as a combination of hardware and software modules, by firmware, and/or otherwise.

An operating system executed on processor of the computing device is notified of detected connection events to enable device enumeration for hardware devices configured to use the communication bus within a device configuration and power management system implemented by the operating system (block 404). Various different kinds of techniques to notify the operating system 112 when devices are added and removed may be employed. In one approach, interrupts may be communicated by the intermediate controller 204 to the processor 202 for handling by the operating system 112 responsive to detection of connection events by the intermediate controller 204. Various kinds of interrupts are contemplated including but not limited to edge-triggered, level-triggered, and message signaled interrupts. Other kinds of messages and notification systems may also be employed. For example, alert messages in a designated format that are indicative of connection events may also be communicated for handling by an integrated notification system provided by the operating system 112.

In one example, the intermediate controller 204 is configured to use general purpose input/output (GPIO) signals 306 (e.g., interrupts) to notify the operating system 112 and/or a device manager 114 of the system when hardware comes and goes. For example, a high GPIO pin value may indicate connection of a device and a low GPIO pin value may indicate disconnection of a device. As described above, in some scenarios the device manager 114 is configured as an ACPI 308 implemented by the operating system 112. Therefore, the GPIO signals 306 or other notifications described herein may be configured for consumption by ACPI 308. Other kinds of device configuration and management systems are also contemplated.

Figure 5:
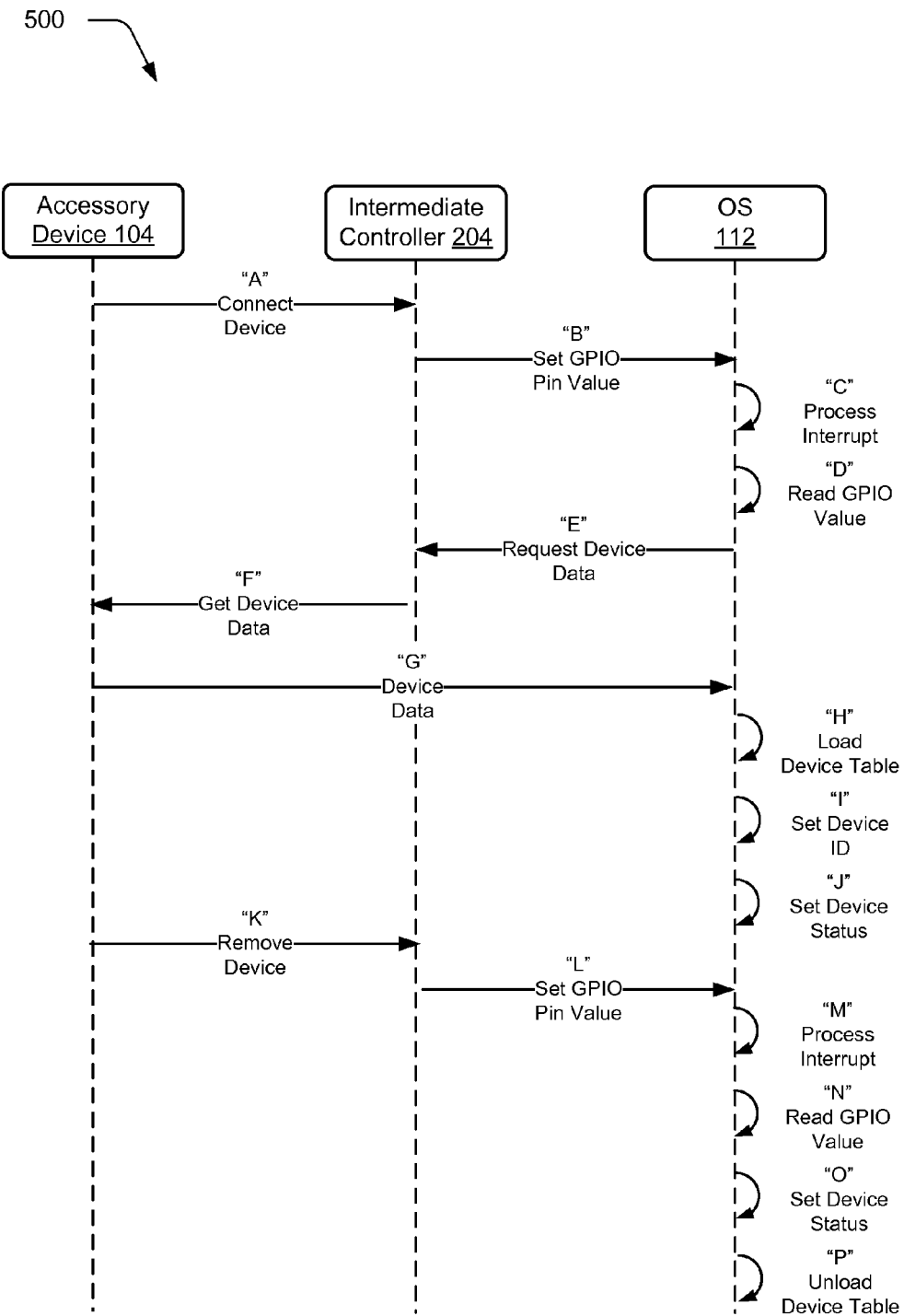
FIG. 5 is a flow diagram depicting example operations performed to support device enumeration for busses that do not natively support enumeration in accordance with one or more embodiments.

FIG. 5 depicts a state diagram generally at 500 that illustrates example operations performed to enable device enumeration for busses that do not natively support enumeration in one or more embodiments. In particular operations associated with enumerating and denumerating an example accessory device 104 are shown in FIG. 5 and are labeled as respective letters A through P. At "A", the accessory device 104 is connected and an intermediate controller 204 may detect the connection as previously described. For instance, a keyboard, musical accessory, cover, or other accessory device 104 may be connected to a computing device 102 via a corresponding interface. At "B", the intermediate controller 204 may set a GPIO pin value (or send another suitable notification) to signal the operating system 112 in response to detecting connection of the accessory device. The GPIO pin value may be conveyed via a single control line that provides an interrupt for handling by the operating system 112 (and/or a corresponding device manager 114 implement by the OS, such as ACPI). Now, the interrupt may be processed at "C" and the operating system 112 may read the value of the GPIO at "D". This enables a determination of whether the GPIO pin value is set high or low and accordingly whether the accessory device 104 is being connected or disconnected. In this example, the GPIO pin value is set high to indicate connection of the device 104 and the operating system 112 is therefore alerted that a connection has occurred. As noted, other types of notifications indicative of connection of a hardware device may also be employed.

When a device is connected, the operating system 112 may perform operations to enumerate the device for device configuration and management within the system. This may involve creating a node or other suitable representation of the device to facilitate management of the device and interaction with the device within the operating system environment. To do so, the operating system 112 may request device data at "E". This request may be sent to the intermediate controller 204, which is configured to communicate a get device data request at "F" to the accessory device 104 on behalf of the OS.

In response to the request, the accessory device 104 may communicate device data 212 for receipt by the operating system 112. Device data 212 may include at least a device ID that may be used to distinguish between different devices. Other device data 212 may also be supplied such as status information, capability data that describes available functions, a device name or nickname, metadata, and/or other device parameters. The operating system 112 may then use the device data 212 to produce an appropriate representation of the device. For example, a device table provided via a device manager 114 to enumerate available hardware may be loaded at "H" and an node/representation for the device in the table may be added (or an pre-existing node may be updated) to reflect availability of the device. In particular, the device ID for the device may be set in the table at "I" and the record may be populated at "J" to set device status to connected/active and/or to reflect other parameters described by device data 212. The connected accessory device 104 is now recognized by the operating system as being connected and various interactions may occur with the accessory device 104 via the node/representation.

A similar process may occur when the accessory device is subsequently removed as represented at "K". The intermediate controller 204 may detect the removal and signal the operating system in a prescribed manner. In at least some scenarios, this again involves setting the GPIO pin value as shown at "L", which may be communicated as another interrupt. The operating system may process the interrupt at "M" and read the corresponding GPIO value. In this example, the GPIO pin value is set low to indicate disconnection of the accessory device 104 and the operating system 112 is therefore alerted that a disconnection has occurred.

Responsive to the disconnection, the operating system 112 may perform operations to denumerate the device. In general, this involves removing or deactivating the node/representation of the device that is created in the device table. Thus, as depicted in FIG. 5 the operating system 112 may set device status at "O" to disconnect/inactive and/or unload the device table at "P".

Having considered the foregoing example procedures, consider now an example system and device in accordance with one or more embodiments.

Example System and Device

Figure 6:
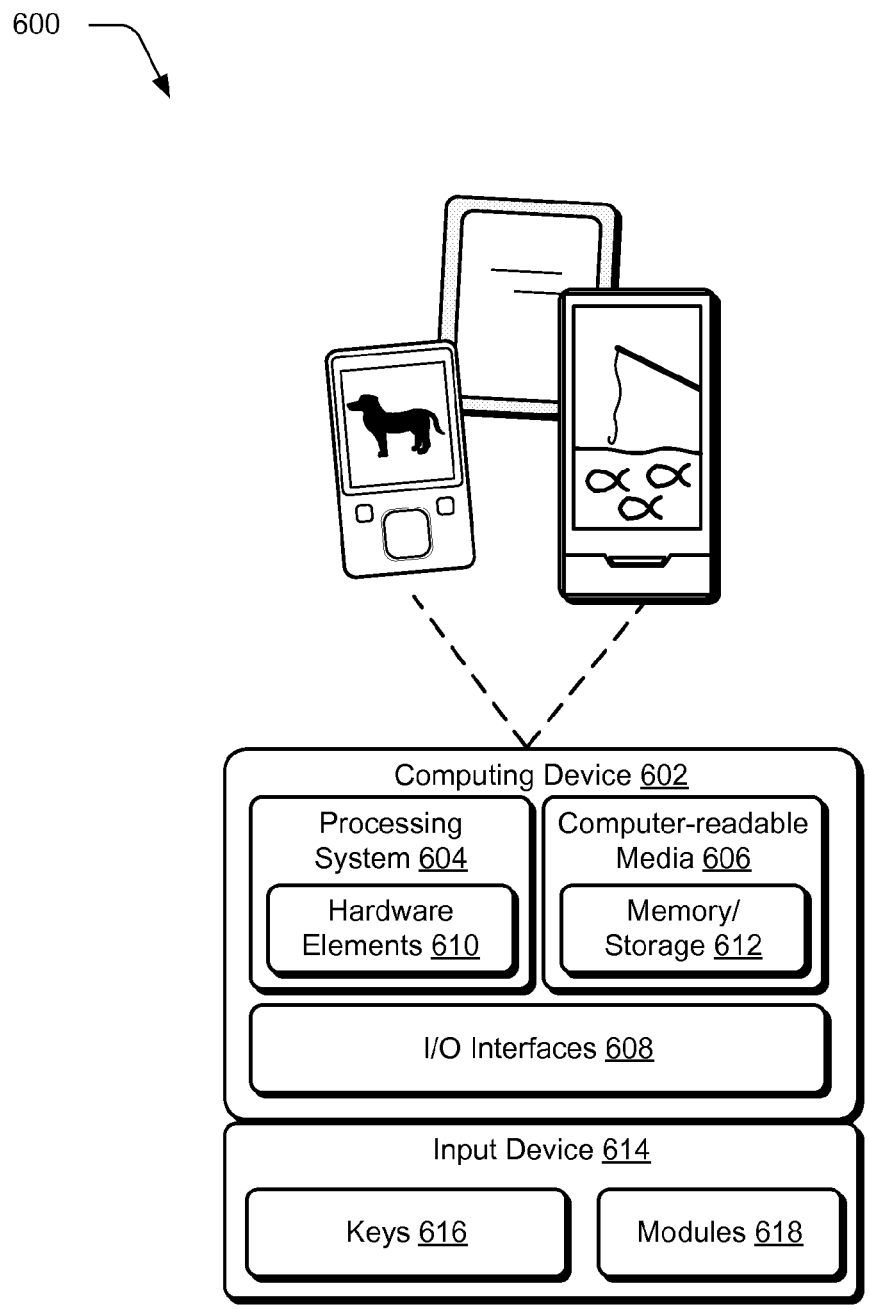
FIG. 6 illustrates an example system including various components of an example device in accordance with one or more embodiments.

FIG. 6 illustrates an example system generally at 600 that includes an example computing device 602 that is representative of one or more computing systems and/or devices that may implement the various techniques described herein. The computing device 602 may be, for example, be configured to assume a mobile configuration through use of a housing formed and size to be grasped and carried by one or more hands of a user, illustrated examples of which include a mobile phone, mobile game and music device, and tablet computer although other examples are also contemplated.

The example computing device 602 as illustrated includes a processing system 604, one or more computer-readable media 606, and one or more I/O interface 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware element 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 606 is illustrated as including memory/storage 612. The memory/storage 612 represents memory/storage capacity associated with one or more computer-readable media. The memory/storage component 612 may include volatile media (such as random access memory (RAM)) and/or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways to support user interaction.

The computing device 602 is further illustrated as being communicatively and physically coupled to an input device 614 that is physically and communicatively removable from the computing device 602. In this way, a variety of different input devices may be coupled to the computing device 602 having a wide variety of configurations to support a wide variety of functionality. In this example, the input device 614 includes one or more keys 616, which may be configured as pressure sensitive keys, mechanically switched keys, and so forth.

The input device 614 is further illustrated as include one or more modules 618 that may be configured to support a variety of functionality. The one or more modules 618, for instance, may be configured to process analog and/or digital signals received from the keys 616 to determine whether a keystroke was intended, determine whether an input is indicative of resting pressure, support authentication of the input device 614 for operation with the computing device 602, and so on.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Thus, computer-readable storage media does not include signal bearing or transitory media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

CONCLUSION

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. A method comprising:
   detecting by an intermediate controller of a computing device connection events for hardware devices configured to removably connect to a communication bus employed by the computing device that does not natively support device enumeration; and
   notifying by the intermediate controller an operating system executed on a processor of the computing device of detected connection events to enable device enumeration for hardware devices configured to use the communication bus within a device configuration and power management system implemented by the operating system.

2. A method as described in claim 1, wherein the notifying comprises sending interrupts from the intermediate controller to the processor to signal the connection events to the operating system.

3. A method as described in claim 2, wherein the interrupts are communicated via a single control line disposed between the intermediate controller and the processor.

4. A method as described in claim 1, wherein the notifying comprises setting a value of a general purpose input/output (GPIO) pin according to the detected connection events.

5. A method as described claim 1, wherein the connection events include events corresponding to addition of hardware devices to the computing device and events corresponding to removal of hardware devices from the computing device.

6. A method as described in claim 1, wherein the device configuration and power management system implemented by the operating system is an advanced configuration and power management (ACPI) interface.

7. A method as described in claim 1, wherein data is communicated between the processor and the intermediate controller using an Inter-Integrated Circuit ($I^2C$) bus.

8. A method as described in claim 1, wherein the notifying comprises sending an indication to the operating system responsive to connection of an accessory device to the communication bus to cause the device configuration and power management system to create a representation for the accessory device.

9. A method as described in claim 1, wherein the notifying comprises sending an indication to the operating system responsive to disconnection of an accessory device from the communication bus to cause the device configuration and power management system to remove an existing representation for the accessory device.

10. A method implemented by a computing device comprising:
    detecting a first interrupt indicative of connection of an accessory device to the computing device via a communication bus employed by the computing device that does not natively support device enumeration;
    retrieving device data for the accessory device including at least a device identifier;
    enumerating the accessory device by creating a node for the accessory device within a device configuration and power management system implemented by the operating system based on the device identifier that is retrieved;
    subsequently obtaining a second interrupt indicative of disconnection of the accessory device; and
    denumerating the accessory device by removing the node for the accessory device from the device configuration and power management system.

11. A method as described in claim 10, wherein the first interrupt and the second interrupt are configured as general purpose input/output (GPIO) signals communicated via a control line associated with the communication bus.

12. A method as described in claim 10, wherein the first interrupt and the second interrupt are communicated to a processor of the computing device by an intermediate controller of the computing device for detection by the operating system executed on the processor.

13. A method as described in claim 12, wherein the intermediate controller is configured to connect to the processor and the accessory device via different respective communication busses.

14. A method as described in claim 10, further comprising exposing a user interface having a list of available hardware devices including the accessory device when enumerated to facilitate interaction with the available hardware devices.

15. A computing device comprising:
    an interface configured to support a removable communicative coupling of an accessory device to a communication bus employed by the computing device that does not natively support device enumeration;
    a processor configured to execute an operating system; and
    an intermediate controller communicatively coupled to the interface and the processor, the intermediate controller configured to:
        detect connection of the accessory device to the interface; and
        set a general purpose input/output (GPIO) pin to a value indicative of the connection of the accessory device to notify the operating system of the connection and thereby cause the operating system to enumerate the accessory device within a device configuration and power management system implemented by the operating system.

16. A computing device as described in claim 15, wherein to enumerate the accessory device the operating system is configured to:
    obtain a device identifier for the accessory device in response to reading the general purpose input/output (GPIO) pin value indicative of connection; and
    create a representation of the accessory device in a device table associated with the device configuration and power management system to facilitate interaction with the accessory device.

17. A computing device as described in claim 15, wherein the intermediate controller is further configured to:
    detect disconnection of the accessory device from the interface; and
    set the general purpose input/output (GPIO) pin to a value indicative of the disconnection of the accessory device to notify the operating system of the disconnection of the accessory device and thereby cause the operating system to denumerate the accessory device within a device configuration and power management system implemented by the operating system.

18. A computing device as described in claim 17, wherein to denumerate the accessory device the operating system is configured to:
    remove a representation of the accessory device from a device table associated with the device configuration and power management system in response to reading the general purpose input/output (GPIO) pin value indicative of disconnection.

19. A computing device as described in claim 15, wherein the communication bus communication that does not natively support device enumeration is configured as one of a serial peripheral interface (SPI) bus, universal asynchronous receiver/transmitter (UART) bus, or Inter-Integrated Circuit (I2C) bus.

20. A computing device as described in claim 15, wherein the intermediate controller is configured to support device enumeration for multiple different communication busses employed by the computing device that do not natively support device enumeration.

* * * * *